3,539,506
RECOVERY OF BORIC ACID FROM
BORATE BRINE
Jacqueline C. Kane, Leonia, N.J., and Richard L. Angstadt, Armonk, N.Y., assignors to Stauffer Chemical Company, New York, N.Y., a corporation of Delaware
No Drawing. Filed Oct. 31, 1967, Ser. No. 681,059
Int. Cl. B01d 15/06; C02b 1/56; C01b 35/00
U.S. Cl. 210—32                                     5 Claims

ABSTRACT OF THE DISCLOSURE

A process for recovering boron values from solutions containing borate salts consisting of forming a borate complex on a solid insoluble resinous composition at a pH of at least above 4. The complex is then treated with a mild mineral acid to form boric acid and reform the solid insoluble resinous composition. The solid insoluble resinous composition is a polysaccharide selected from the group consisting of cellulose, starch, glycogen, fructan, hemicellulose, plant gum, animal polysaccharide and mixtures thereof.

BACKGROUND OF THE INVENTION

In some end uses, it is desirable to remove boron compounds, usually borates, from solutions containing a number of other salts. An example of the removal of the boron compounds is in the commercial processing of Searles Lake brine for the recovery of sodium borate and boric acid. Additionally, the presence of the boron compounds in irrigation water greatly restricts the use thereof. This is particularly critical in arid regions where borates, boric acid or borosilicates are almost invariably present in the natural waters. Thus, these materials must be removed for proper use of the irrigation water.

Generally, borax and other boron containing materials are recovered from dilute solutions containing them by evaporation and/or by cooling the solution so that the boron salt or boric acid crystallizes out of the solution. However, below a limiting boron concentration this method is not economical and as such has not been widely used. Also, in this process the presence of other salts will interfere with the over-all operation.

Another method for recovering borax and other boron containing materials from dilute liquors containing them employs liquid-liquid extraction with polyols. This is brought about by forming complexes between the borate ion and a liquid polyhydric compound or dissolved polyhydric compound. These complexes should be formed at a pH above about 4. Once formed they should be reacted with an acid at a pH below about 4 to form boric acid and regenerate the original polyhydric compound. Conventionally, the polyhydric compounds are liquid polyols such as glycerol, glycol, 2-ethyl-1,3-hexanediol or the like. Alternatively, solutions of solid polyols dissolved in water immiscible solvents such as kerosene, petroleum ether and octanol have been employed. See for example U.S. Pat. No. 2,969,275 and No. 3,111,383. While this procedure has enjoyed some commercial significance, it has several undesirable inherent features. Since the polyols used are either liquid or solutions of solids in the organic solvents, any extraction of boron values from dilute solutions requires that large volumes of liquid be admixed and subsequently separated. The problems involved in separating one liquid from another are well known. Borate values can only be reclaimed from a polyol solution by a second liquid-liquid extraction operation using dilute acid. Again, separation of one liquid from another is required. Furthermore, the large volumes of liquid that must be handled require high capital expenditures for equipment and materials and result in increased operating expenses. Thus, a more efficient operation is required.

BRIEF DESCRIPTION OF THE INVENTION

It has been discovered that boric acid can be recovered by complexing dissolved borate ions with certain solid insoluble resinous compounds having a high number of reactive hydroxyl groups. The solid insoluble resinous compounds having a high number of reactive hydroxyl groups may be selected from the polysaccharide group comprising cellulose, starch, glycogen, fructan, hemicellulose, plant gum, animal polysaccharide or mixtures thereof. Both amylose and amylopectin starches can be used. The borate complexes are then subjected to mild acid conditions to form boric acid and to regenerate the original solid reactive hydroxyl compound. The resultant liquid-solid mixture can then be readily separated.

DETAILED DESCRIPTION OF THE INVENTION

In the practice of the present invention, an aqueous boron containing solution, i.e., a solution containing salt such as sodium borate, potassium borate or calcium borate, is subjected to intimate association with an insoluble solid resin composition having a large number of reactive hydroxyl groups. The insoluble resinous compounds that are useable with the present invention may be selected from the polysaccharide group consisting of cellulose, starch, glycogen, fructan, hemicellulose, plant gum, animal polysaccharide, or mixtures thereof. The pH of this reaction should be above about 4 and preferably above 7. By subjecting the borate solution in intimate association with the insoluble resin composition, a borate complex is formed on the solid insoluble resin composition. The borate complex is then intermixed with a mineral acid such as hydrochloric acid, phosphoric acid, nitric acid, but preferably sulfuric acid which forms a mixture of boric acid, sodium sulfate and the regenerated original insoluble resin composition. Since the insoluble resin composition will decompose by hydrolysis under strong acid conditions, the mineral acid is diluted to have a concentration of between 0.001 N and about 0.5 N. The upper concentration limit can vary, if desired, but will be set by the decomposition rate of the resin. This latter reaction should be conducted at a pH below 4. After separating the acidic boron containing liquid from the solid resinous composition, boric acid can be crystallized by conventional means from the aqueous sodium sulfate solution.

In its preferred form, the practice of the present invention embodies the reaction between a borate solution and the insoluble resinous composition in a packed tower wherein the borate solution is passed through the tower at a suitable temperature. This procedure promotes intimate contact between the materials.

Examples of the process are set forth below to illustrate the procedure by which the insoluble resins of the present invention are employed in the absorption of borate ions. It is to be understood that these examples are for illustrative purposes only and are not intended to limit the scope of the invention.

EXAMPLE 1

A 500 ml. sample of Searles Lake brine containing 8.01 grams of sodium tetraborate was passed through a 75 gram bed of starch at the rate of 1 ml./min./g. resin. The following amounts of $Na_2B_4O_7$ were removed:

TABLE 1

| Starch | $Na_2B_4O_7$ removed from brine | |
|---|---|---|
| | G. | Percent |
| 70% amylose starch | 4.12 | 51.5 |
| 100% amylopectin starch | 3.59 | 44.9 |
| 30% amylose–70% amylopectin starch | 3.11 | 38.8 |

EXAMPLE 2

The 70% amylose starch sample treated with brine in Example 1 was eluted with 0.001 N $H_2SO_4$. Eighty-two percent of the boron present on the starch was eluted as boric acid.

EXAMPLE 3

The 100% amylopectin starch containing boron prepared in Example 1 was treated with 0.05 N $H_2SO_4$. Ninety-two percent of the available boron was removed as boric acid.

EXAMPLE 4

The 30% amylose–70% amylopectin starch from Example 1 was treated with 0.001 N $H_2SO_4$. Eighty-six percent of the available boron was eluted as boric acid.

EXAMPLE 5

A 500 ml. sample of Searles Lake brine containing 7.87 grams of sodium tetraborate was passed through a 75 gram bed of cellulose at the rate of 1 ml./min./g. resin. The following amounts of $Na_2B_4O_7$ were removed:

TABLE 2

| Cellulose | $Na_2B_4O_7$ removed from brine | |
|---|---|---|
| | G. | Percent |
| Cotton cellulose | 5.30 | 67.4 |
| Woodpulp cellulose | 1.11 | 14.1 |
| Microcrystalline nonfibrous cellulose | 2.94 | 37.3 |

EXAMPLE 6

The cotton cellulose treated with brine as described in Example 5 was eluted with .001 N $H_2SO_4$. Sixty-three percent recovery of boric acid was achieved.

EXAMPLE 7

The microcrystalline cellulose treated with brine in Example 5 was eluted with 0.01 N $H_2SO_4$. Eighty-four percent recovery of boric acid was accomplished.

EXAMPLE 8

The woodpulp containing boron prepared in Example 5 gave a 68% recovery of boric acid when treated with 500 ml. of 0.1 N $H_2SO_4$.

What is claimed is:
1. A process for recovering boron values from solutions containing the salts thereof, comprising the steps of:
 (a) bringing an aqueous solution containing a borate salt dissolved therein into intimate association, at a pH of at least above about 4 with a solid, insoluble polysaccharide composition;
 (b) treating the resulting borate complex which is formed on said polysaccharide, at a pH of less than about 4, with a mineral acid diluted to a concentration of between about 0.001 N to 0.5 N so as to form boric acid and to reform the solid, insoluble polysaccharide composition; and
 (c) separating the boric acid from said solid, insoluble polysaccharide composition.

2. The process as set forth in claim 1, wherein said polysaccharide can be selected from the group consisting of cellulose, starch, glycogen, fructan, hemicellulose, plant gum, animal polysaccharide and mixtures thereof.

3. The process as set forth in claim 1, wherein said mineral acid is sulfuric acid.

4. A process for treating water contaminated with boron values dissolved therein, comprising the steps of:
 (a) passing the water through a bed of solid, insoluble polysaccharide composition at a pH of at least above about 4 thereby forming a borate complex on said solid, insoluble polysaccharide composition;
 (b) treating said borate complex at a pH of less than about 4, with a mineral acid diluted to a concentration between about 0.001 N to 0.5 N so as to form boric acid and to reform the solid, insoluble polysaccharide composition; and
 (c) separating the boric acid from said solid, insoluble polysaccharide composition.

5. The process of treating water as set forth in claim 4, wherein said polysaccharide can be selected from the group consisting of cellulose, starch, glycogen, fructan, hemicellulose, plant gum, animal polysaccharide and mixtures thereof.

References Cited
UNITED STATES PATENTS

| 2,969,275 | 1/1961 | Garrett | 23—149 X |
| 3,082,173 | 3/1963 | Horvitz | 210—54 X |
| 3,085,853 | 4/1963 | Lesinski et al. | 210—54 X |
| 3,111,383 | 11/1963 | Garrett et al. | 23—149 |
| 3,216,795 | 11/1965 | Brown et al. | 23—149 |

FOREIGN PATENTS 816,510  7/1959  Great Britain.

HERBERT T. CARTER, Primary Examiner

U.S. Cl. X.R.

23—149; 210—37